US006988309B2

(12) United States Patent
Fore

(10) Patent No.: US 6,988,309 B2
(45) Date of Patent: Jan. 24, 2006

(54) ASSEMBLY MACHINE FOR HAND-HELD ADHESIVE LABEL DISPENSERS

(76) Inventor: Robert Scott Fore, 414 E. Maxwell St., Lakeland, FL (US) 33803

( * ) Notice: Subject to any disclaimer, the term of this patent is extended or adjusted under 35 U.S.C. 154(b) by 223 days.

(21) Appl. No.: 10/359,794

(22) Filed: Feb. 7, 2003

(65) Prior Publication Data

US 2004/0155050 A1 Aug. 12, 2004

(51) Int. Cl.
*B23Q 21/00* (2006.01)

(52) U.S. Cl. .......................................... 29/714; 29/709

(58) Field of Classification Search .................. 29/714, 29/712, 709, 700; 156/387, 64, 566; 83/88
See application file for complete search history.

(56) References Cited

U.S. PATENT DOCUMENTS

| | | | | |
|---|---|---|---|---|
| 1,844,285 | A * | 2/1932 | Johnson | 206/445 |
| 5,192,392 | A | 3/1993 | Peterson et al. | |
| 6,234,053 | B1 * | 5/2001 | Olsen et al. | 83/88 |
| 6,358,342 | B1 | 3/2002 | Instance | |
| 6,491,080 | B2 | 12/2002 | Tasma | |
| 6,793,217 | B2 * | 9/2004 | Grønbjerg | 271/197 |

* cited by examiner

*Primary Examiner*—John C. Hong
(74) *Attorney, Agent, or Firm*—McHale & Slavin, P.A.

(57) ABSTRACT

The present invention provides an apparatus for loading and assembling disposable hand-held label applicators ("labelers") in which individual unbacked labels are cut and loaded in a stacked arrangement into a tubular labeler. The labeler is operable in the rapid and flexible fashion necessary to utilize the devices on irregularly shaped objects, as well as flat surfaces, without the need for mechanisms designed to peel away a backing material or rollers to apply moisture or adhesive to a label before application.

14 Claims, 10 Drawing Sheets

ASSEMBLY MACHINE FOR HAND-HELD ADHESIVE LABEL DISPENSERS

FIELD OF THE INVENTION

This invention relates to a device and method for loading and assembling disposable hand-held label dispensers. The inventive machine is designed with a unique routing allowing it to cut and load unbacked adhesive material into a stacked arrangement within disposable tube applicators.

BACKGROUND OF THE INVENTION

In the modern assembly line production of products for the mass-market, as well as in the end retail market, an important stage is the labeling of the product. Although a good deal, and often all, of the information needed on the package (UPC, source identification, etc.) can be printed on the wrapping material itself, there often remains the need to affix other labels. These labels include in particular, but are not limited to, point of origin, price tags, theft-mitigation tags and the like. Such labels are often applied by the end retailer, either to the outside of the product or to the outside of the product's packaging. However, large retailers have recently began to demand these labels be already affixed when the products arrive from the manufacturer or wholesale-distributor.

The vast volume and variety of labels applied has led to numerous specialized pieces of equipment designed to apply labels to products ("labelers"). In the past labels were typically supplied to the labelers in two forms: with adhesive "self-adhesive" or without adhesive "linerless."

Self-adhesive labels are typically manufactured and used in a pre-printed and pre-cut form. The label making equipment advances the composite self-adhesive label material and non-adhesive backing from a supply reel, through a printer which can provide desired indicia such as text and graphics onto the label. The label material is then fed through a die-cutter where the adhesive labels are cut without cutting the non-adhesive backing material; any matrix surrounding the cut labels is peeled away and discarded. The individual labels being releasably attached to the roll of non-adhesive backing are thereafter rewound into a coiled arrangement for use by manufacturers or retailers in label application machinery.

Labelers utilizing the coils of self-adhesive labels peel away the non-adhesive backing and place the labels with the pre-applied adhesive on the back to the desired surface. The machinery utilized to accomplish this task may be as simple as manual hand-held equipment or complicated specialized equipment designed to apply labels to a specific size or type of product.

Linerless label applicators utilize pre-printed and pre-cut labels without pre-applied adhesive. Liquid adhesive is applied to the back of the label using a glue roller. The adhesive label is transferred to a transfer roller with the front edge of the label secured to the transfer roller. The transfer roller translates and presses the label against the desired surface. This causes the label, due to the adhesive on the back of the label, to stick to the desired surface. The label is then smoothed onto the surface by brushes. These roller type labeling machines are often difficult to control, often leaving labels that peel or unattractively wrinkle soon after application.

Several problems have arisen in the prior art devices that utilize pre-cut self-adhesive labels. Often the label is not cut cleanly from the continuous web of label material, leaving an undesirable and aesthetically unpleasing appearance to the severed length of the label material. The adhesive labels often leave residual adhesive on the peeler bars used to strip the labels from the backing and place them on the labeled surface. The residual adhesive can then be transferred to product surfaces and leave unattractive marks. Additionally, the non-adhesive backing material must continuously be rewound or torn away by the equipment.

Accordingly, what is lacking in the art is a device for assembling disposable hand-held label-applicators in which individual unbacked labels are utilized in a stacked arrangement operable in the rapid and flexible fashion necessary to utilize the devices on irregularly shaped objects, as well as flat surfaces, without the need for mechanisms designed to peel away a backing material or rollers to apply moisture or adhesive to a label before application.

DESCRIPTION OF THE PRIOR ART

A number of prior art devices exist for cutting and applying labels to products.

U.S. Pat. No. 5,192,392 discloses an automatic container labeler for a conveyor arrangement which includes a stack of labels stored in a label supply hopper. A transfer assembly removes labels one at a time from the label supply hopper, and a drive assembly drives the label from the transfer assembly to an adhesive application assembly. Thereafter a label pressing member presses the label onto the container. Since the adhesive is applied to the label after the label leaves the hopper, this system cannot be said to be analogous to the instant invention.

U.S. Pat. No. 6,491,080 discloses a label printer/applicator. The device feeds in a continuous web of adhesive material on a non-adhesive backing to the printer station wherein indicia is printed onto the adhesive web. Thereafter a cutting mechanism cuts the adhesive web into individual labels without severing the non-adhesive backing. The backing material is then advanced over a label separator roller or "peeler" bar onto a take up reel while the labels are applied to the products by the label applicator. Since this device utilizes labels from a coil with a non-adhesive backing it cannot be said to be analogous to the instant invention.

U.S. Pat. No. 6,358,342 discloses an apparatus and method of producing a succession of self-adhesive labels carried on a backing of release material. The apparatus prints a succession of labels on a web, laminates the printed web with a folded leaflet and cuts the succession of self-adhesive labels from the laminated assembly.

Typically these devices have difficulties associated with peeling the labels from the non-adhesive backing and rewinding or tearing away the backing material. Nothing in the prior art teaches or suggests a labeler assembly apparatus wherein unbacked labels are placed in a stacked arrangement within a tubular member.

SUMMARY OF THE INVENTION

The present invention provides a device for loading and assembling disposable hand-held label applicators ("labelers") in which individual unbacked labels are utilized in a stacked arrangement. The labeler is operable in the rapid and flexible fashion necessary to utilize the devices on irregularly shaped objects, as well as flat surfaces, without the need for mechanisms designed to peel away a backing material or rollers to apply moisture or adhesive to a label before application.

In the loading and assembly of the hand-held labelers, label tubes having an open end cap pre-installed on one end are placed in a hopper. The open end cap has a removably adhered cellophane cover attached over its aperture. As gravity forces the label tubes from the tube hopper they are oriented in an upright manner with the open end cap facing downward and stacked under the die block in a linear arrangement. A rake member is forced into the tubes. Tines on the rake member spread the tubes evenly and precisely align each tube under a corresponding die aperture.

The self-adhesive label web with the non-adhesive backing is fed from a pay-out reel to a position over a first roller. The backing is separated from the label web and advanced under a second roller to be rewound on the backing reel. The unbacked label web continues under a third roller and travels across the die block. Targets on the label web are counted by an electronic eye as they pass across the die block. After the correct number of labels are advanced and located above the die block, plunger solenoids are energized forcing the cutters through the label web, pushing the cut labels downward through a corresponding die aperture into the distal end of the label tubes below. The plunger solenoids are thereafter de-energized, returning the cutters to their neutral position. The punched label web matrix threads under a fourth roller where it turns perpendicular to the die block, goes around a fifth roller turning horizontal to and traveling behind the die block across a sixth roller where the punched matrix exits the machine and is rewound on the matrix reel. This advances more labels across the die block and the process is repeated until a predetermined number of labels have been stacked inside each of the label tubes.

After the label tubes are filled, the rake is backed out to its neutral position. The emptier solenoids are energized to push the filled tubes into the middle chute. Gravity forces the filled tubes to stack against the tube drop area in the assembler section of the machine. The emptier solenoids are then de-energized, returning them to their neutral position. An electric motor is energized to provide motive force to the conveyor chain oriented horizontally in the assembler. Semi-circle shaped carriers fastened to the conveyor chain locate and move the tube and label assemblies along the conveyer path. Targets on the carriers are registered by photo eyes at drop points, energizing solenoids to drop the next respective part into the corresponding tube. Pistons, springs, and caps are forced by gravity from hoppers to stack into their corresponding drop points in the assembler. The energized solenoids drop the piston, spring, and closed cap into the tube respectively before the tube completes a circuit. As the carrier aligns below the last station solenoids are energized, pressing the closed end cap onto the tube, compressing the spring, and biasing the piston and the stacked labels toward the aperture in the open end cap. The solenoids are de-energized and the assembled hand-held labelers are carried to the discharge chute where discharge fingers strip the tube from the carrier and gravity forces the labelers into a holding bin.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangement of the components set forth in the following description or illustrated in the drawings. The drawings constitute a part of this specification and include exemplary embodiments of the present invention and illustrate various objectives and features thereof. The invention is capable of other embodiments and being practiced and carried out in other ways. Also, it is to be understood that the phraseology and terminology employed herein are for the purpose of description and should not be regarded as limiting.

As such, those skilled in the art will appreciate that the conception upon which this disclosure is based, may readily be utilized as a basis for designing other structures, methods and systems for carrying out the several purposes of the present invention. It is important, therefore, that the claims be regarded as including such equivalent construction insofar as they do not depart from the spirit and scope of the present invention.

The principles and objectives of the present invention include, but are not limited to providing a method and apparatus for cutting and assembling hand-held label applicators in which individual unbacked labels are utilized in a stacked arrangement.

Accordingly, a primary objective of the instant invention is to teach an apparatus for loading and assembling hand-held label applicators in which individual unbacked labels are utilized in a stacked arrangement.

Another objective of the instant invention is to teach a method of loading and assembling hand-held label applicators in which individual unbacked labels are utilized in a stacked arrangement.

Other objectives and advantages of this invention will become apparent from the following description taken in conjunction with the accompanying drawings wherein set forth, by way of illustration and example, certain embodiments of this invention.

DETAILED DESCRIPTION OF THE PREFERRED EMBODIMENT

Figure 1:
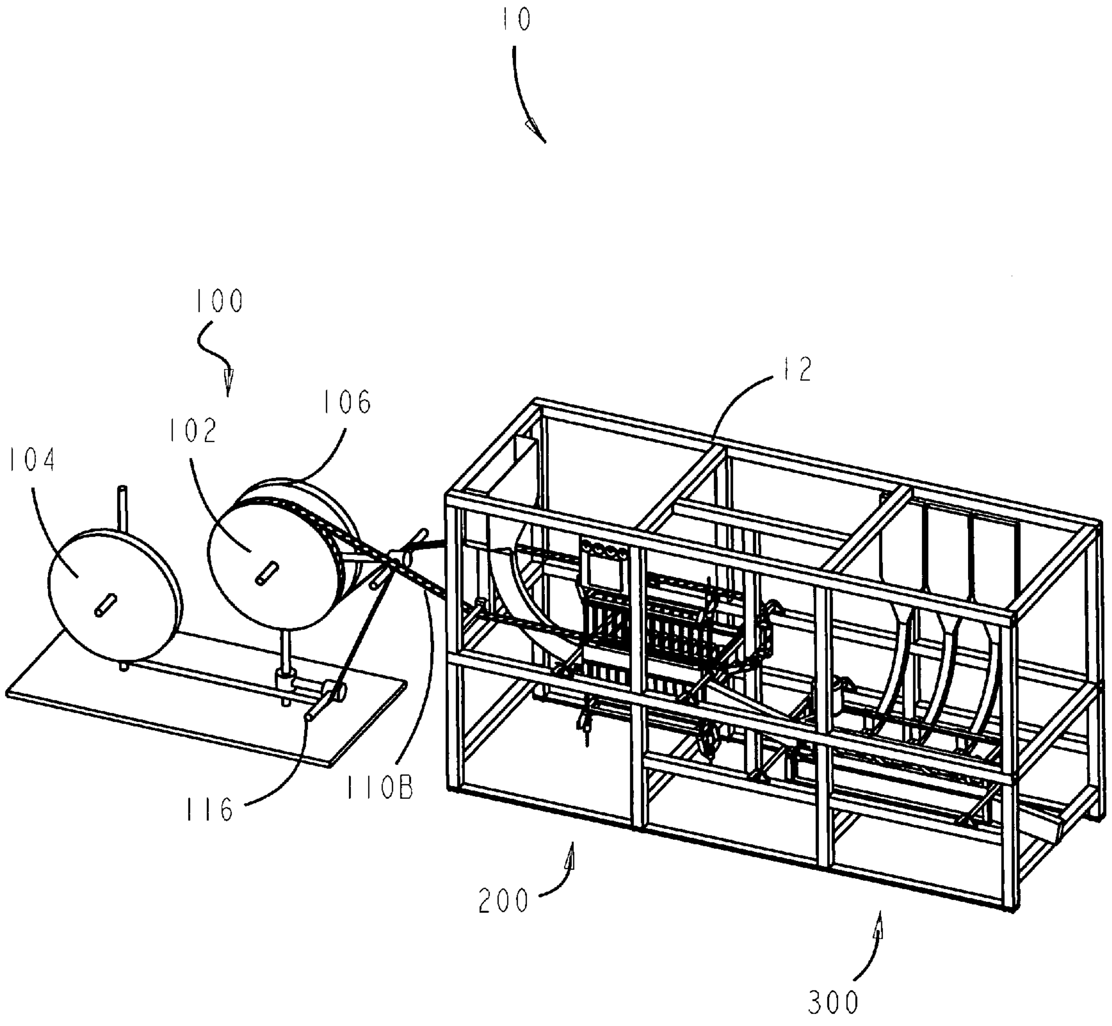
FIG. 1 is an isometric view illustrating the instant invention.

Referring now to FIG. 1, illustrated is the apparatus, designated generally as the assembly machine 10, for stuffing and assembling the hand-held labelers of the present invention. The assembly machine 10 includes three main modules, the reel module 100, the cutting and loading module 200, and the assembly module 300. The reel module 100 generally contains the mechanisms necessary to handle the adhesive label webbing material 102, the backing material 104, and the label matrix 106. The cutting and loading module 200 is located within the support frame 12 and generally contains the mechanisms necessary to cut the labels from the webbing as well as locate and load cut labels into the label tubes. The assembly module 300 is also located within the support frame 12 and generally contains the mechanisms necessary to distribute and assemble the remaining components necessary to complete the hand-held label applicators.

Figure 2:
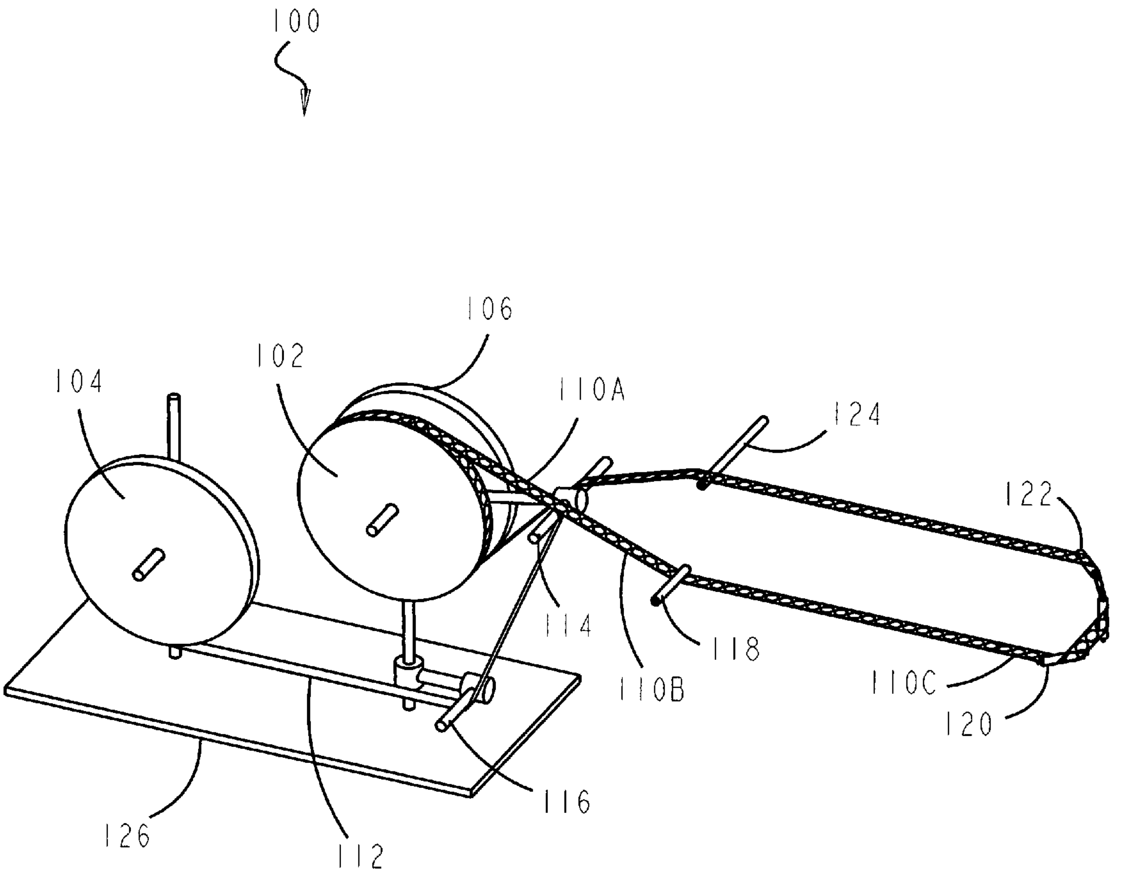
FIG. 2 is an isometric view of the winder module of the instant invention illustrating the paths of the adhesive label web and the non-adhesive backing; the cutter module and the assembly module are omitted for clarity.

Referring to FIG. 2, the reel module 100 and the adhesive label web path is illustrated, with the cutting and loading module 200 and the assembly module 300 omitted for clarity. The reel module 100 generally includes a support frame 126 upon which a pay-out reel 102, a backing reel 104, and a matrix reel 106 are rotatably mounted. The pay-out reel 102 holds a continuous preprinted composite roll of label web 110A having indicia and electronic targets preprinted on its non-adhesive side and a non-adhesive backing 112 releasably attached to the pre-applied adhesive. The continuous composite label web 110A is fed from the pay-out reel 102 to a position over a first roller 114. The backing 112 is separated from the label web 110B and threaded under a second roller 116 to be rewound on the backing reel 104. The unbacked label web 110B is threaded under a third roller 118 and across the die block (not shown), where the individual labels are cut from the web leaving a web matrix 110C, to the fourth roller 120. The punched web matrix 110C thereafter threads under the fourth roller 120 where it turns perpendicular to the die block, goes around a fifth roller 122 turning horizontal to and behind the die block, across a sixth roller 124 where the punched matrix 110C exits the machine and is wound on the matrix reel 106. The unique path taken by the unbacked label web allows it to advance through the device without the pre-applied adhesive substantially contacting the apparatus. The pay-out 102, backing 104, and matrix reels 106 are rotatably mounted on the base member 126 and include stepping motors which may either be directly or indirectly connected to each reel. The stepping motors are preferably controlled by a programmable logic controller (PLC) which is a widely available off-the-shelf circuit. The PLC can be programmed to receive a number of inputs from sensors including but not limited to: optic sensors, pressure sensors, encoders, counters and the like. Using the inputs the PLC can precisely control the position and tension applied to the label web 110 and backing strip 112 throughout their paths. The PLC can also be used to supply alarms and the like to operators of the machine, e.g. low label supply, jams in chutes and the like. Alternatively, the device could be controlled by a computer or a suitable dedicated circuit constructed and arranged to receive signals from the sensors and use the signals received to control the stepper motors and alarms.

Figure 3:
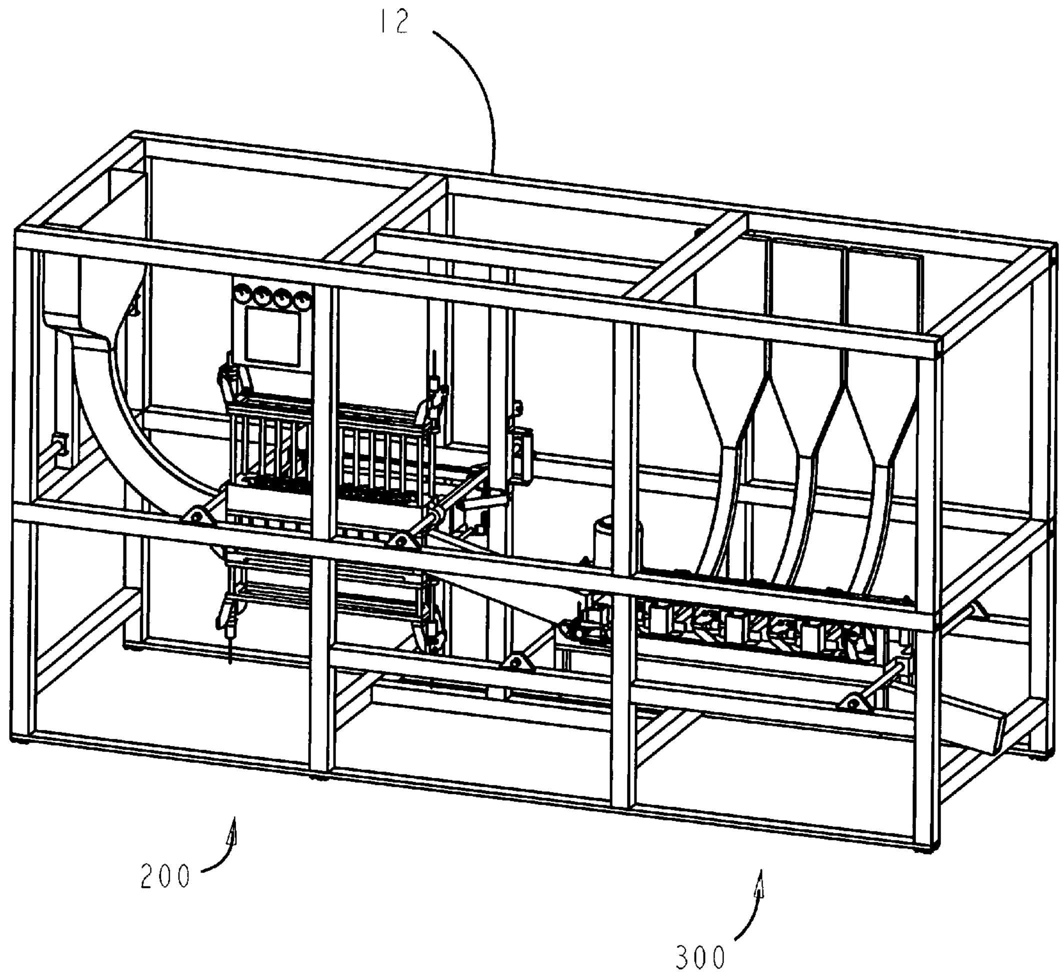
FIG. 3 is an isometric view illustrating the cutter module and the assembly module mounted within the support frame; the winder module and the adhesive label web are omitted for clarity.

Referring to FIG. 3, illustrated is the cutting module 200 and the assembly module 300 mounted within the support frame 12. The reel module 100 and the adhesive label web 110 are omitted for clarity. The support frame 12 is constructed and arranged to provide support to both the cutting and loading module 200 and the assembly module 300. The support frame 12 is preferably constructed of a material such as steel tubing or the like.

Figure 4:
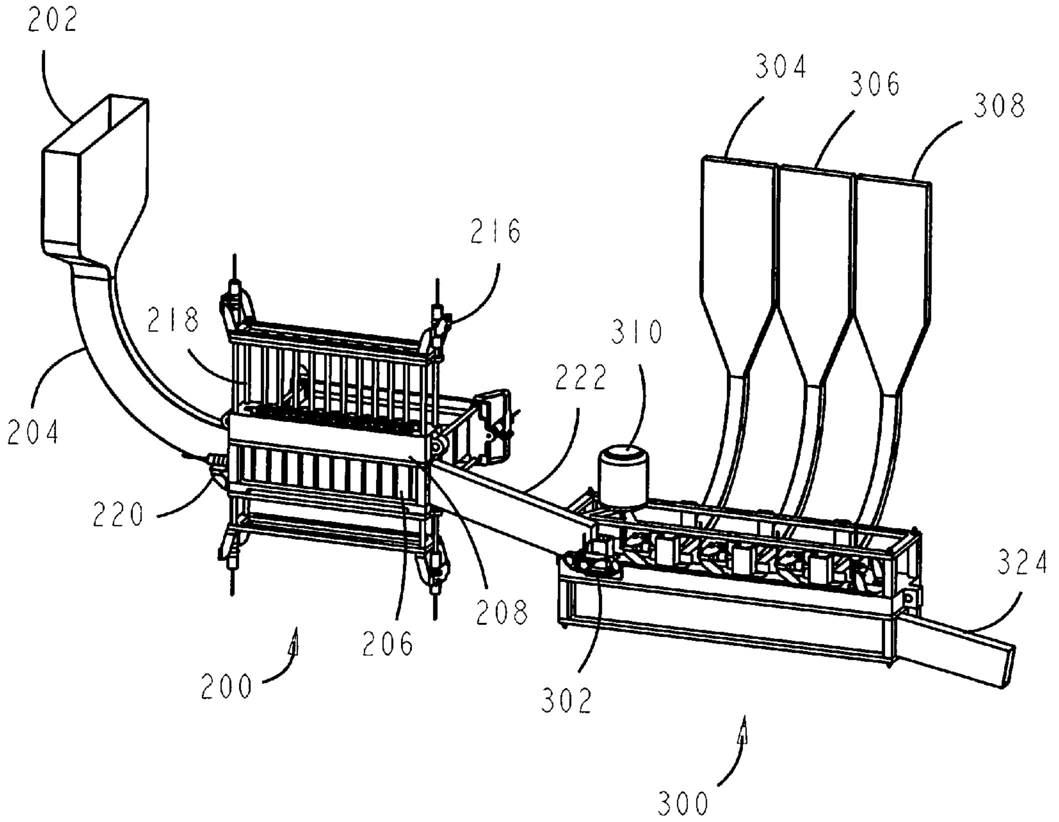
FIG. 4 is an isometric view illustrating the cutter module and the assembly module; the support frame is omitted for clarity.

Referring to FIG. 4, the cutting and loading module 200 and the assembly module 300 are illustrated with the support frame 12 omitted for clarity. The cutter module 200 generally contains the mechanisms necessary to orient and position the label tubes under the die block as well as the mechanisms to locate, cut and load individual labels into a stacked arrangement within the label tubes.

Figure 5:
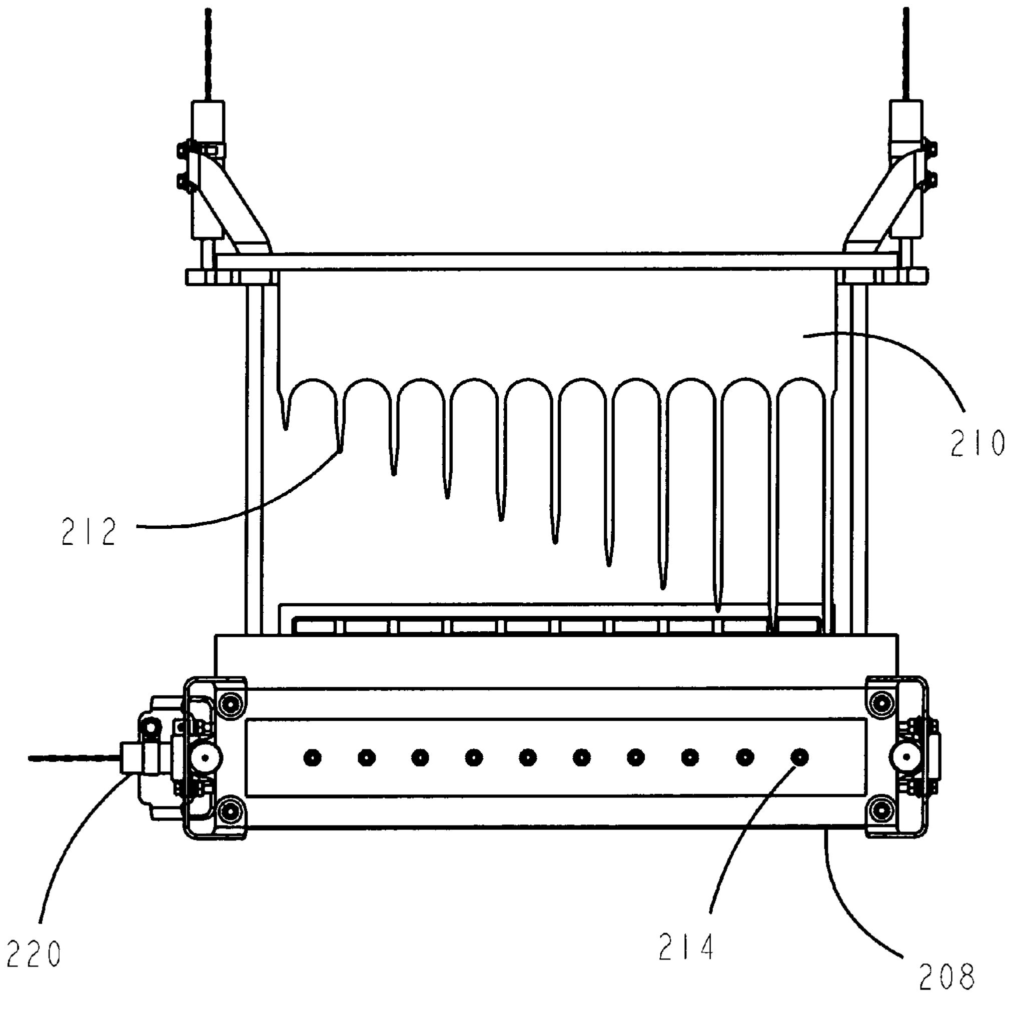
FIG. 5 is a top view of a portion of the cutter module illustrating the bolster plate, the die block and the rake mechanism.
Figure 9:
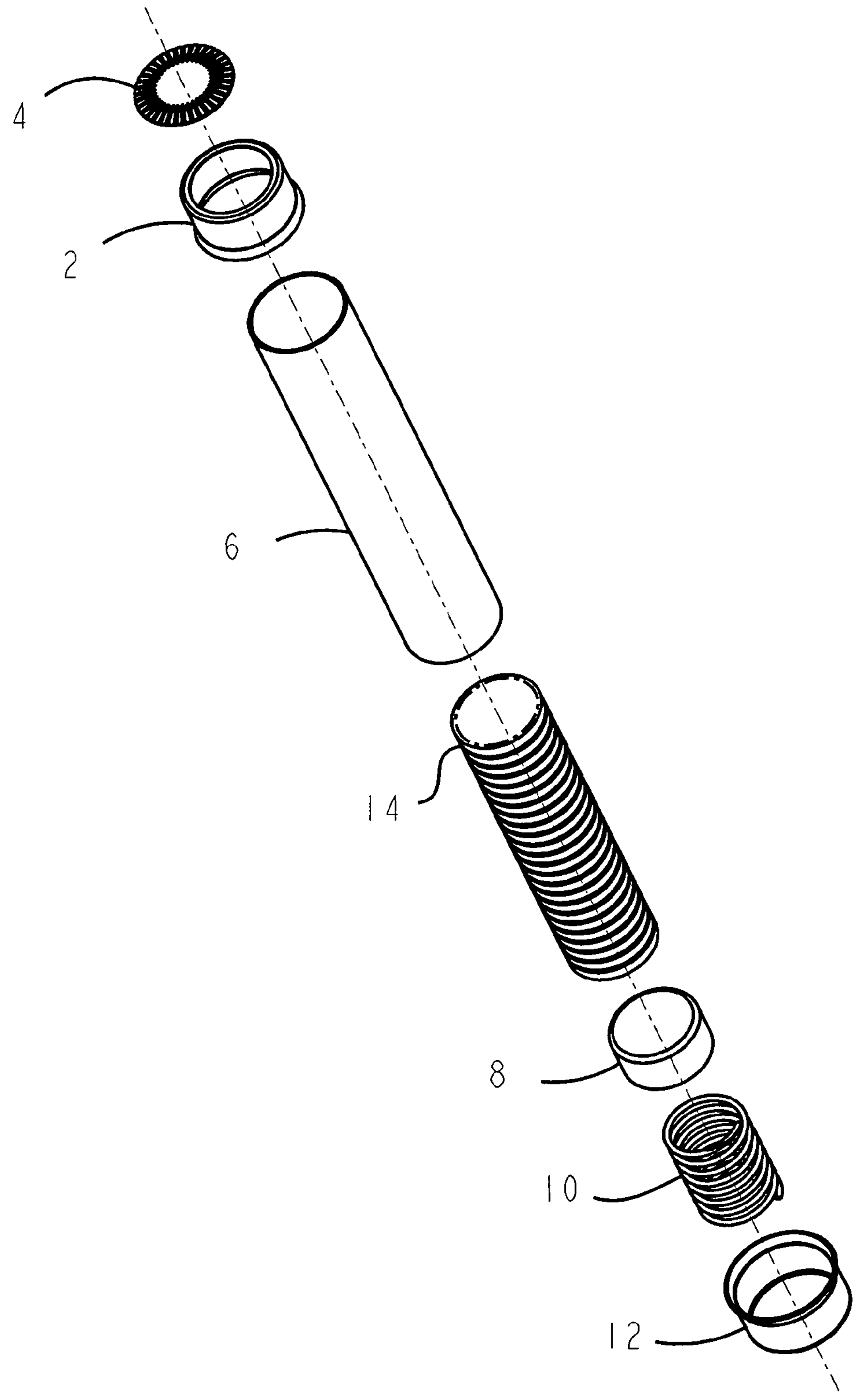
FIG. 9 is an exploded view illustrating the hand-held label applicator assembled by the instant invention.
Figure 10:
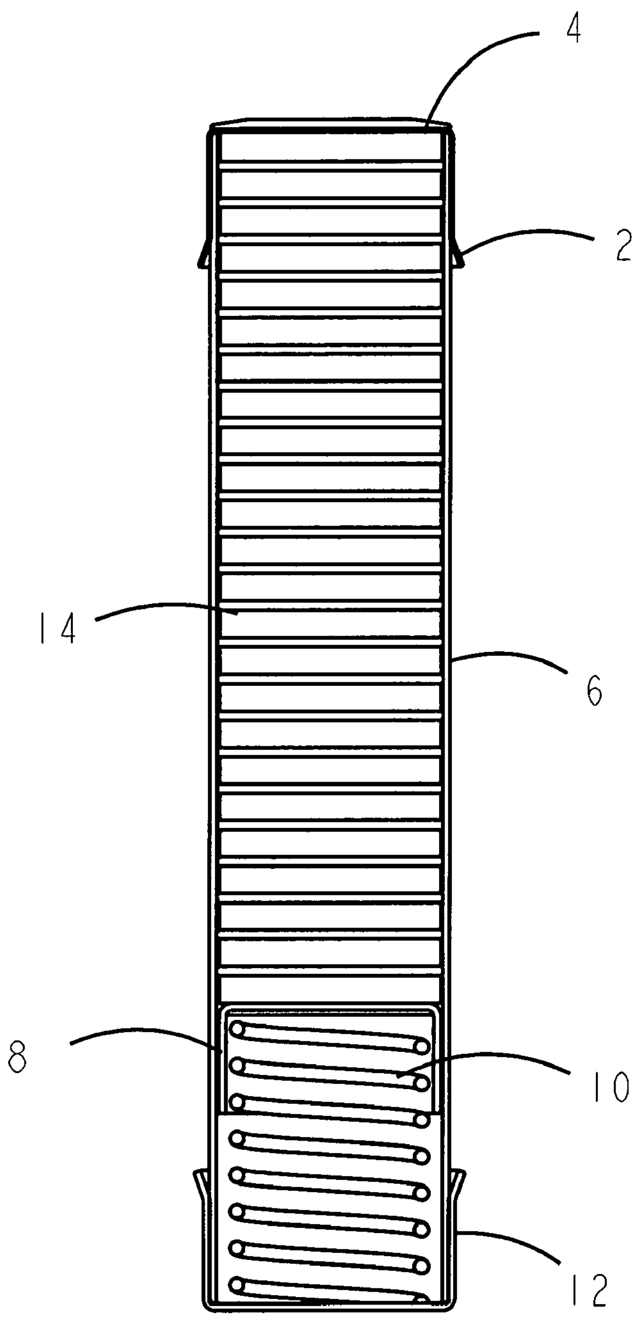
FIG. 10 is a section view of a hand-held label applicator device assembled by the instant invention.

In a preferred embodiment a supply of label tubes 6 (FIG. 9) having an open end cap 2 (FIG. 9) pre-attached are placed in the tube supply hopper 202. The open end cap 2 includes a removably adhered cellophane cover 4 (FIG. 9) covering the open aperture. Gravity forces the label tubes 6 from the tube hopper 202 and through a chute 204 to stack in a linear arrangement against the distal end of the bolster plate 206 under the die block 208. The rake 210 (FIG. 5) is forced into the tubes and the tines 212 on the rake 210 spread and align the tubes evenly under a corresponding die aperture 214.

Figure 6:
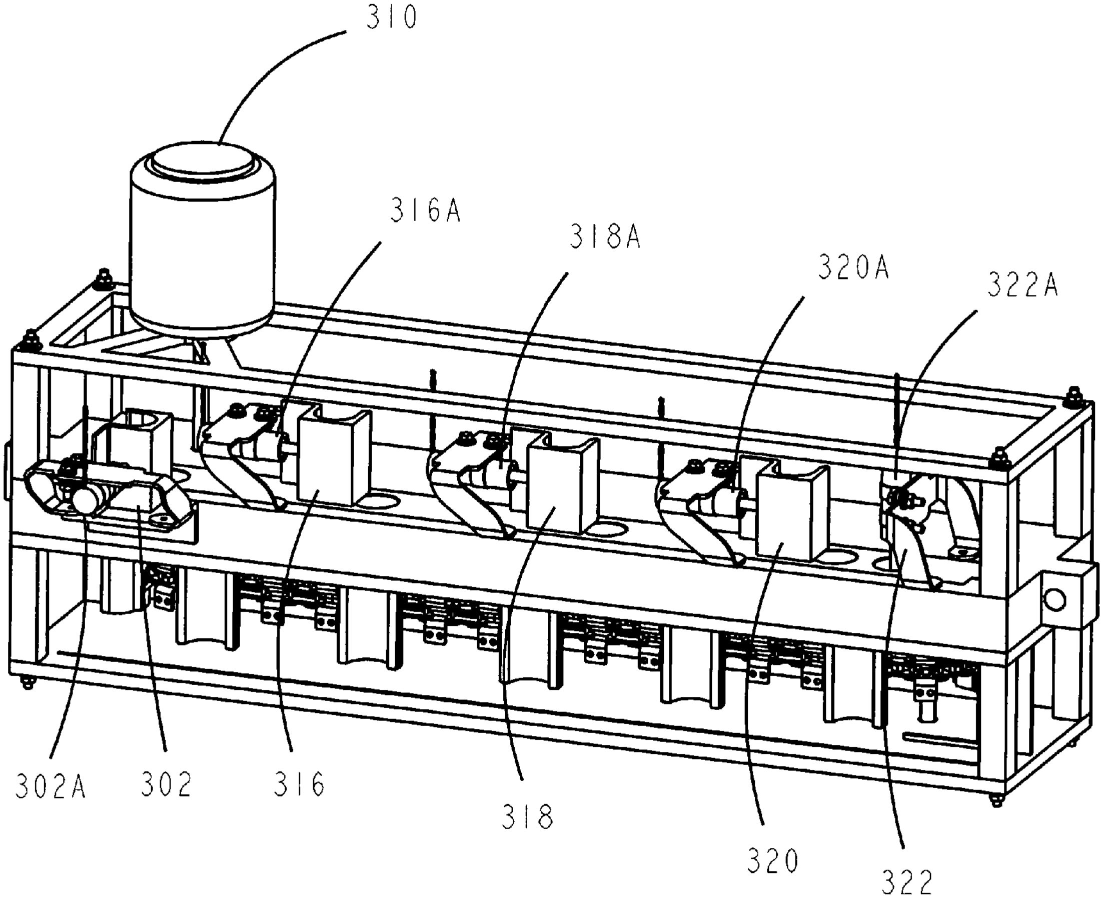
FIG. 6 is an isometric view of the assembly module with the piston, spring, and closed end cap hoppers omitted for clarity.
Figure 7:
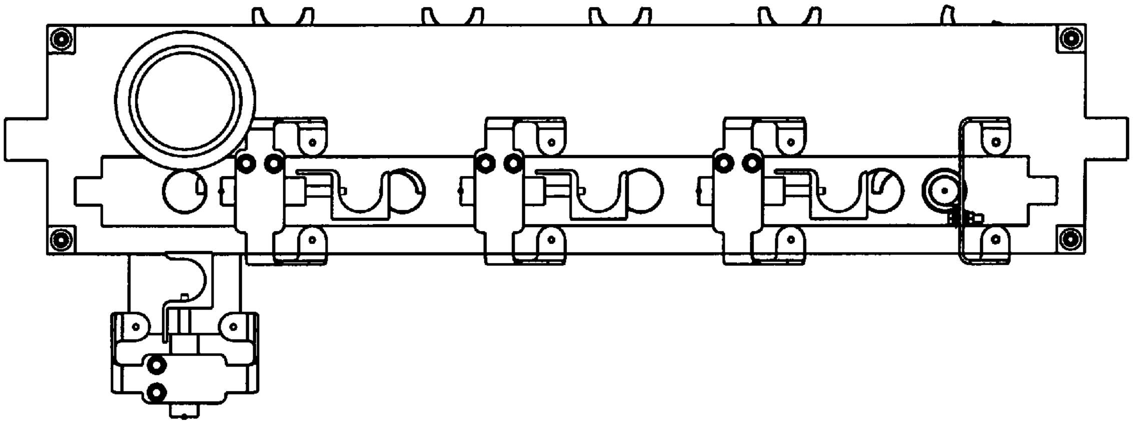
FIG. 7 is a partial top view of the assembly module illustrating the piston, spring, and closed end cap drop points.
Figure 8:
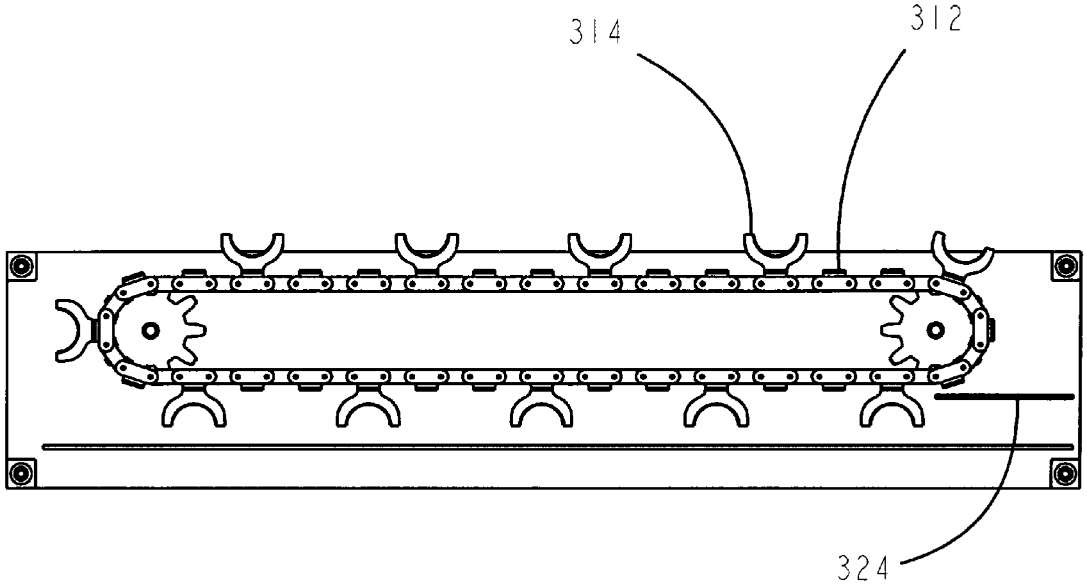
FIG. 8 is a partial top view of the assembly module illustrating the conveyor chain having the semi-circle shaped carriers fastened thereto.

As the unbacked adhesive web 110B is advanced across the die block 208 targets on the web are counted by an electronic eye (not shown). When the correct number of labels are advanced and located above the die block 208, plunger solenoids 216 are energized to force the punches 218 through the web 110B and convey the punched label into the distal end of each corresponding tube 6 below. The plunger solenoids 216 are de-energized and return to their neutral position. This advances more label web 110B and the process is repeated until a predetermined number of labels have been stacked inside each of the label tubes. After the label tubes are filled the rake 210 is backed out to its neutral position. The emptier solenoids 220 are energized, pushing the filled tubes into the middle chute 222. Gravity forces the filled tubes to stack against the tube drop 302 in the assembler section 300. The emptier solenoids 222 are de-energized and return to their neutral position. An electric motor 310 is energized to provide motive force to the conveyor chain 312 (FIG. 8) oriented horizontally in the assembler module 300. Semi-circle shaped carriers 314 fastened to the conveyor chain 312 locate and move the tube and label assemblies along the conveyer path. As targets on the carriers 314 are registered by photo eyes at each drop point solenoids are energized allowing the next respective part to drop into the corresponding tube 6. Pistons 8, springs 10, and caps 12 (FIG. 9) are forced by gravity from their respective hoppers 304, 306, 308 to stack into their corresponding drop points in the assembler. As the solenoids 316A, 318A, 320A (FIG. 6) are energized the piston 8, spring 10, and closed cap 12 (FIG. 9) are dropped into place. As the carrier aligns below the last station solenoid 322 is energized, pressing the closed cap 12 onto the tube 6, compressing the spring 10, and biasing the piston 8 and the stacked labels 14 toward the aperture in the open end cap 2. The solenoid 322A is de-energized and the carrier 314 carries the completed labeler to the discharge chute 324 where discharge fingers strip the labeler from the carrier 314 and gravity forces the assembled labelers into a holding bin.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

I claim:

1. A high speed device for assembling hand-held labelers comprising:

an assembler having a receiving module, a cutting and stuffing module, and an assembly module;

a continuous roll of self-adhesive label web with non-adhesive backing spirally wound about a central axis and rotatably mounted in said receiving module;

a traversing means in mechanical engagement with said assembler and with said self-adhesive label web and constructed and arranged to advance said self-adhesive label web from said receiving module through said cutting and stuffing module and back to said receiving module;

a control means for sending and receiving electrical signals, said control means in electrical communication with said receiving module, said cutting and stuffing module, said assembly module, and said traversing means;

wherein said assembler device provides hand-held disposable tubular labelers containing a plurality of unbacked labels in a stacked arrangement.

2. The hand-held labeler assembly device of claim 1 wherein said receiving module includes:

a supply reel for containing said continuous roll of self-adhesive label web with said non-adhesive backing spirally wound about a central axis and rotatably mounted;

a backing separator means for separating said non-adhesive backing from said self-adhesive label web;

a backing reel for spirally winding said non-adhesive backing about a central axis;

a web matrix reel for spirally winding said self-adhesive web after being advanced through said cutting and stuffing module.

3. The hand-held labeler assembly device of claim 2 wherein said backing separator means includes at least one roller, said roller rotatably secured to said receiving module and positioned proximate said supply reel in said self-adhesive label web path.

4. The hand-held labeler assembly device of claim 1 wherein said traversing means includes at least one stepper motor in electrical communication with said control means for selectively powering said traversing means to advance said self-adhesive web from said receiving module through said cutting and stuffing module and back to said receiving module.

5. The hand-held labeler assembly device of claim 1 wherein said cutting and stuffing module includes a label tube supply means for orienting and stacking said label tubes in a linear arrangement under a die block;

a label cutting means, said label cutting means including a die block having at least one aperture therethrough and a punch constructed and arranged to cooperate with said at least one die aperture;

a label tube locating means for locating said at least one label tube under said die block aperture;

a label tube stuffing means for placing said cut unbacked labels in a stacked arrangement within said at least one label tube;

a sensing means for providing input variables into said control means for detecting the advancement of said label web, said sensing means in electrical communication with said control means;

a counting means for counting cut label stacked into said at least one label tube, said counting means in electrical communication with said control means;

wherein said sensing means positions said label web over said die aperture and causes said punch to be forced through said web conveying said cut label into said tube, said process repeated and counted by said counting means.

6. The hand-held labeler assembly device of claim 5 wherein said label tube supply means includes a hopper and a chute, said hopper and chute constructed and arranged for orienting said at least one label tube under said die block.

7. The hand-held labeler assembly device of claim 5 wherein said label tube locating means includes a rake member, said rake member having a plurality of tines constructed and arranged to separate and secure said at least one label tube.

8. The hand-held labeler assembly device of claim 5 wherein said label cutting means includes at least one solenoid for causing said punch to advance through said label web, said at least one solenoid in electrical communication with said control means.

9. The hand-held labeler assembly device of claim 5 wherein said label tube stuffing means includes locating said at least one label tube under said die aperture so that said punch advancing through said label web places said cut label in a stacked arrangement within said at least one label tube.

10. The hand-held labeler assembly device of claim 5 wherein said sensing means includes at least one sensor for detecting a succession of locations along said self-adhesive label web, said at least one sensor in electrical communication with said control means.

11. The hand-held labeler assembly device of claim 10 wherein said at least one sensor for detecting a succession of locations along said self-adhesive label web is an optical sensor for electrically communicating to said control means the advancement of said label web across said die block.

12. The hand-held labeler assembly device of claim 10 wherein said assembly module includes;

a conveyer means for conveying said labels tubes with said unbacked labels in a stacked arrangement along a predetermined path, said conveyer means having at least one integrated sensor for electrical communication with said control means;

a label tube drop means for feeding said stuffed label tubes into said conveyer means, said label tube drop station in electrical communication with said control means;

a piston drop means for feeding pistons into said stuffed label tubes, said piston drop station in electrical communication with said control means;

a spring drop means for feeding springs into said stuffed label tubes, said spring drop station in electrical communication with said control means;

a cap drop means for feeding closed end caps onto said stuffed label tubes, said cap drop station in electrical communication with said control means;

a press means for pressing said closed cap onto said stuffed label tubes, said press means in electrical communication with said control means.

13. The hand-held labeler assembly device of claim 5 wherein said means for counting said cut labels stacked into said at least one label tube includes at least one sensor, said sensor in electrical communication with said control means.

14. The hand-held labeler assembly device of claim 1 wherein said control means is a programmable logic computer configured and arranged to send and receive electrical signals for control of said assembler.

* * * * *